(12) United States Patent
Yu et al.

(10) Patent No.: US 10,489,786 B2
(45) Date of Patent: Nov. 26, 2019

(54) OPTIMIZATION OF FRAUD DETECTION MODEL IN REAL TIME

(71) Applicant: Vesta Corporation, Portland, OR (US)

(72) Inventors: Jiaqi Yu, Sherwood, OR (US); Jianning Le, Lake Oswego, OR (US)

(73) Assignee: VESTA CORPORATION, Portland, OR (US)

( * ) Notice: Subject to any disclaimer, the term of this patent is extended or adjusted under 35 U.S.C. 154(b) by 562 days.

(21) Appl. No.: 14/951,060

(22) Filed: Nov. 24, 2015

(65) Prior Publication Data
US 2017/0148024 A1    May 25, 2017

(51) Int. Cl.
*G06Q 40/00*     (2012.01)
*G06Q 20/40*     (2012.01)

(52) U.S. Cl.
CPC ................ *G06Q 20/4016* (2013.01)

(58) Field of Classification Search
CPC .......................... G06Q 20/40; G06Q 20/4016
USPC ....................................................... 705/35–40
See application file for complete search history.

(56) References Cited

U.S. PATENT DOCUMENTS

| | | |
|---|---|---|
| 5,819,226 A | 10/1998 | Gopinathan |
| 7,793,835 B1 | 9/2010 | Coggeshall et al. |
| 8,919,641 B2 | 12/2014 | Bishop et al. |
| 9,740,991 B2 | 8/2017 | Seidman |
| 9,892,465 B2 | 2/2018 | Love et al. |
| 2003/0006277 A1 | 1/2003 | Maskatiya |
| 2007/0106582 A1 | 5/2007 | Baker |
| 2008/0015978 A1* | 1/2008 | Curry ................... G06Q 40/025 705/38 |
| 2008/0027860 A1 | 1/2008 | Mullen |
| 2008/0275748 A1 | 11/2008 | John |
| 2009/0222243 A1 | 9/2009 | Zoldi |
| 2010/0057622 A1 | 3/2010 | Faith |
| 2010/0094767 A1* | 4/2010 | Miltonberger ....... G06Q 10/067 705/325 |

(Continued)

FOREIGN PATENT DOCUMENTS

EP        2790146       10/2014

OTHER PUBLICATIONS

Gourieroux: "Infrequent Extreme Risks" CREST, CEPREMAP and University of Toronto, The Geneva Papers on Risk and Insurance Theory. (Year: 2004).*

(Continued)

*Primary Examiner* — Edward J Baird
(74) *Attorney, Agent, or Firm* — Beyer Law Group LLP

(57) ABSTRACT

A payment processing system continuously processes transactions having data elements. A profile table exists for each data element of the transactions and is continuously updated with risk variables in real time. Risk metrics of various types are calculated in real-time if criteria are met. A risk metric percentage is compared to one of two thresholds to determine whether or not to trigger a strike and whether or not to turn on alert for a particular data element of a profile table. If an alert is turned on then the thresholds become more restrictive for that particular data element for future transactions. Fraud model parameters are also adjusted if a strike is triggered or an alert is turned on. An alert is turned off after passage of time and if the risk metric for a future transaction is below a threshold. Rules are created in real time if an alert is on.

12 Claims, 9 Drawing Sheets

(56) References Cited

U.S. PATENT DOCUMENTS

| | | | |
|---|---|---|---|
| 2010/0280880 A1* | 11/2010 | Faith | G06Q 10/06375 |
| | | | 705/7.37 |
| 2011/0131122 A1 | 6/2011 | Griffin | |
| 2011/0173116 A1 | 7/2011 | Yan | |
| 2011/0225158 A1 | 9/2011 | Snyder et al. | |
| 2011/0238510 A1 | 9/2011 | Rowen | |
| 2011/0238575 A1 | 9/2011 | Nightengale et al. | |
| 2011/0307381 A1 | 12/2011 | Kim | |
| 2012/0030083 A1* | 2/2012 | Newman | G06Q 40/00 |
| | | | 705/35 |
| 2012/0036073 A1* | 2/2012 | Basu | G06Q 20/40 |
| | | | 705/44 |
| 2012/0226613 A1 | 9/2012 | Adjaoute | |
| 2014/0156568 A1 | 6/2014 | Ganguly | |
| 2014/0230033 A1 | 8/2014 | Duncan | |
| 2014/0244503 A1* | 8/2014 | Sadlier | G06Q 20/40 |
| | | | 705/44 |
| 2014/0258118 A1* | 9/2014 | Scott | G06Q 20/204 |
| | | | 705/44 |
| 2014/0258162 A1 | 9/2014 | Maran et al. | |
| 2014/0279494 A1 | 9/2014 | Wiesman | |
| 2014/0351129 A1* | 11/2014 | Finot | G06Q 20/401 |
| | | | 705/44 |
| 2015/0026027 A1* | 1/2015 | Priess | G06Q 40/00 |
| | | | 705/35 |
| 2015/0026062 A1 | 1/2015 | Paulsen | |
| 2015/0066739 A1* | 3/2015 | Lucas, Jr. | G06Q 40/025 |
| | | | 705/38 |
| 2015/0066797 A1 | 3/2015 | Outwater | |
| 2015/0095247 A1 | 4/2015 | Duan | |
| 2015/0170147 A1 | 6/2015 | Geckle | |
| 2015/0339673 A1 | 11/2015 | Adjaoute | |
| 2016/0005029 A1* | 1/2016 | Ivey | G09C 1/00 |
| | | | 705/44 |
| 2016/0057248 A1* | 2/2016 | Tankha | H04L 67/306 |
| | | | 726/6 |
| 2016/0171498 A1 | 6/2016 | Wang | |
| 2016/0283942 A1 | 9/2016 | Chitragar et al. | |
| 2016/0342963 A1 | 11/2016 | Zoldi | |
| 2017/0132866 A1 | 5/2017 | Kuklinski | |
| 2017/0148025 A1 | 5/2017 | Le et al. | |
| 2017/0148026 A1 | 5/2017 | Lei et al. | |

OTHER PUBLICATIONS

Office Action for U.S. Appl. No. 14/951,087 dated Mar. 21, 2018.
Office Action for U.S. Appl. No. 14/951,087 dated Sep. 25, 2018.
Office Action fo U.S. Appl. No. 14/951,087 dated Dec. 20, 2018.
Office Action for U.S. Appl. No. 14/951,119 dated Apr. 20, 2018.
Office Action for U.S. Appl. No. 14/951,119 dated Oct. 9, 2018.
Office Action for U.S. Appl. No. 14/951,119 dated Feb. 7, 2019.
Office Action for U.S. Appl. No. 14/951,135 dated Jun. 6, 2018.
Office Action for U.S. Appl. No. 14/951,135 dated Oct. 17, 2018.
Office Action for U.S. Appl. No. 14/951,135 dated Mar. 27, 2019.
International Search Report dated Jan. 24, 2017 from International Application No. PCT/US2016/062545.
Written Opinion dated Jan. 24, 2017 from International Application No. PCT/US2016/062545.
Final Office Action for U.S. Appl. No. 14/951,119, dated Aug. 21, 2019.
Final Office Action for U.S. Appl. No. 14/951,087, dated Jul. 1, 2019.

* cited by examiner

| Billing City 204 | AVS Not Match Attempts Amount One Hour 208 | New Payment Device Attempts Amount One Day 212 | New SVA Attempts Amount Three Days 216 | Payment Device/ Telephone City-No Match Attempts Amount Seven Days 220 | Attempts 30 Days 224 | Attempts Amount One Hour 228 | Risk Type 1 Attempts Amount One Day 232 | Risk Type 1 Alert 236 |
|---|---|---|---|---|---|---|---|---|
| Fremont | .079 | 13443.31 | 574.72 | 6926.43 | 8926.43 | 100.69 | 1.116 E-08 | 1 260 |
| Denver | ⌇ | ⌇ | ⌇ | ⌇ | ⌇ | ⌇ | ⌇ | Null |
| Skokie | ⌇ | ⌇ | ⌇ | ⌇ | ⌇ | ⌇ | ⌇ | 0 264 |
| Albany | ⌇ | ⌇ | ⌇ | ⌇ | ⌇ | ⌇ | ⌇ | 0 |
| ••• | ••• | ••• | ••• | ••• | ••• | ••• | ••• | ••• |

200

Billing City Profile Table

*FIG. 3A*

| Billing City 204 | Risk Type 1 Alert ON Date/Time 240 | Risk Type 1 Alert OFF Date/Time 244 | Risk Type 2 Attempts Amount One Hour 248 | Risk Type 2 Alert 252 | Risk Type 2 Alert ON Date/Time 254 | Risk Type 2 Alert OFF Date/Time 256 |
|---|---|---|---|---|---|---|
| Fremont | 2014-08-04 19:52:07.008 | Null | .0068 | 0 | 2014-08-03 23:41:01.853 | 2014-08-05 00:08:27.390 |
| Denver | ≀ | ≀ | ≀ | ≀ | ≀ | ≀ |
| Skokie | ≀ | ≀ | ≀ | ≀ | ≀ | ≀ |
| Albany | ≀ | ≀ | ≀ | ≀ | ≀ | ≀ |
| ... | ... | ... | ... | ... | ... | ... |

200

Billing City Profile Table

OPTIMIZATION OF FRAUD DETECTION MODEL IN REAL TIME

CROSS-REFERENCE TO RELATED APPLICATIONS

This application is related to U.S. patent application Ser. Nos. 14/951,087, 14/951,119, 14/951,135, filed on the same date herewith, which is hereby incorporated by reference.

FIELD OF THE INVENTION

The present invention relates generally to fraud detection when a payment card is used. More specifically, the present invention relates to automatically regulating the behavior of a fraud detection model.

BACKGROUND OF THE INVENTION

In this digital age, merchants are challenged by customers who want near instantaneous transactions across multiple channels and the need to reduce fraudulent transactions. At the same time, merchants struggle to enhance fraud detection for the rapidly growing market of digital goods.

With the prevalence of computers, mobile telephones and the Internet, buyers and sellers can now interact without seeing one another; card-not-present (CNP) transactions in which the merchant never sees the payment card are now much more common. As e-commerce becomes more popular and digital sales and delivery more common, merchants struggle to contain fraudulent payments without inconveniencing customers. A glitch during an e-commerce transaction can result in loss of the transaction for the merchant.

Unfortunately, card-not-present transactions—many of which are performed using computers, a telephone or mobile devices—are responsible for a great deal of fraud. Unfortunately, increasing fraud controls and tightening up fraud detection algorithms in order to detect fraud during a transaction can result in a good transaction being denied and a good customer being turned away.

One particular area ripe for fraud is the sale of digital goods: mobile telephone top-up transactions, electronic books, gift cards, electronic tickets, etc. The sale of digital goods does not require the merchant to see a physical payment card, and moreover, consumers expect to receive their digital goods immediately, leaving the merchant less time to detect potential fraud. Some fraudsters take advantage of weaknesses in e-commerce systems to steal additional goods, while others break into a retailers system in order to steal customer payment card information. In addition, a transaction for digital goods requires no physical address as the digital goods are often delivered via e-mail, text message or credit to a mobile account.

Most fraud detection systems are not yet able to handle the increase in online card-not-present transactions and especially the sale and delivery of digital goods. Existing systems may require time to verify the cardholder's identity and payment, which does not work well with digital goods when immediate delivery is expected. Or, existing systems cannot accurately verify payment details and detect fraud due to the speed of order fulfillment that is required.

Any fraud detection system is measured by its ability to detect fraudulent transactions and to accept legitimate transactions whenever possible. It can be a challenge to optimize for both situations. Existing fraud detection systems use fraud detection models that must be retrained by a human modeler or by a predetermined process using newly available fraud data in order to enhance detection. For example, once a fraud model has been trained and is in production, it has established criteria for fraud detection. The fraud model relies upon the human to retrain the model and to reestablish the criteria—a manual, time-consuming and potentially inaccurate process. Even if a model is retrained via a process using available fraud data that has been reported, there is typically a lag time of anywhere from one to three months from when the fraud actually occurred. Thus, it is often too late to catch similar fraud, and fraudulent transactions stemming from the original fraud have long been processed. Further, traditional fraud models use historical data from a customer or payment device in order to assess risk for that particular customer or payment device, but, some fraud cannot be detected this way. Many transactions involve a new customer, a new payment device or a new stored value account (SVA); traditional models do not do well assessing risk in these situations.

Accordingly, new methods and systems are needed that allow a fraud detection system to change the behavior of fraud detection models in real time.

SUMMARY OF THE INVENTION

To achieve the foregoing, and in accordance with the purpose of the present invention, a payment processing system is disclosed that changes the behavior of a fraud detection model in real time.

The present invention provides a fraud detection system that rapidly determines the real-time risk exposure within the system without using fraud data that has a long delay, such as chargebacks. The real-time risk exposure is used to automatically regulate the behavior of one or more fraud detection models, such as by changing thresholds of a model, by changing rules, and by changing thresholds specific to data elements of a transaction. A fast response is provided to the changing risk exposure of the overall system, thus gaining time to detect fraud and to optimize the fraud detection and transaction conversion rate.

The fraud detection system reacts to the risk exposure of the overall system or a segment, and not necessarily to the risk exposure of a particular transaction. For example, if a set of criteria within the system or a segment of data changes, indicating that risk exposure of the overall system or a segment is higher, then the fraud detection system will react and automatically change one or more of the thresholds, rules or models, making the threshold, rules or models more restrictive. Borderline transactions that earlier would have been processed are now denied. Or, if the overall risk exposure is lower, then a model, threshold or rule may become less restrictive. A model is thus more dynamic and can deal with the overall risk as it changes.

Further, the profile tables, risk variables and risk metrics are calculated and updated in real time as each payment transaction occurs because of the relatively simple calculations that are used. A model, rule or threshold that is adjusted because of the assessed risk of a particular payment transaction is immediately ready to be applied to the next incoming payment transaction (if necessary) because adjustments happen in real time.

BRIEF DESCRIPTION OF THE DRAWINGS

The invention, together with further advantages thereof, may best be understood by reference to the following description taken in conjunction with the accompanying drawings in which:

FIGS. 3A and 3B are an example of a profile table, namely a billing city profile table.

DETAILED DESCRIPTION OF THE INVENTION

As discussed above, a fraud detection system is useful in the detection of fraud involving payment cards in the payment industry. In one embodiment, the fraud detection system is used within a global, online payment processing system such as that operated by Vesta Corporation of Portland, Oreg. The payment processing system is suitable for use with international card networks, local payment networks, and can process payments in numerous currencies.

Payment Processing System Overview

Figure 1:
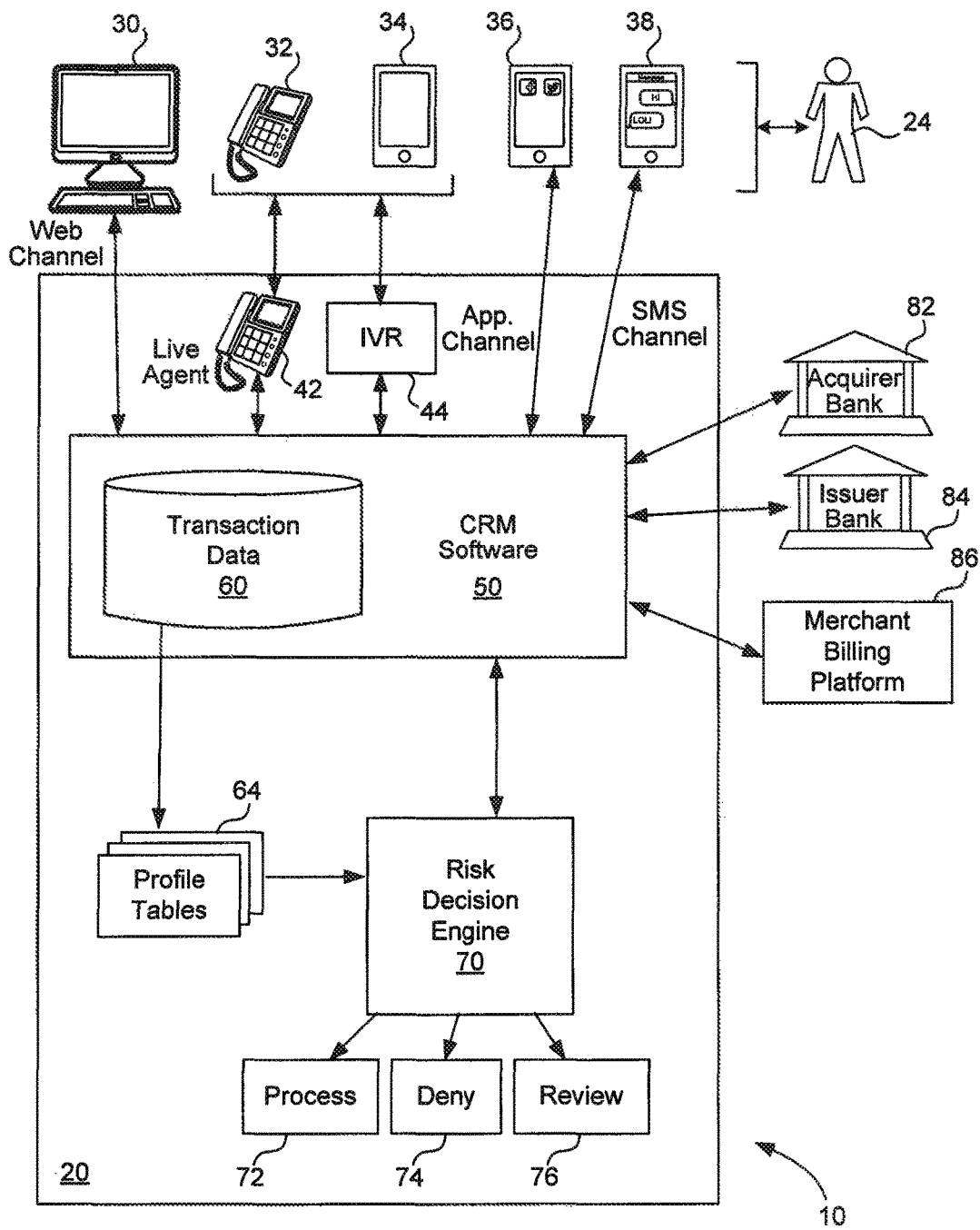
FIG. 1 is an example of a payment processing system that includes a fraud detection system.

FIG. 1 illustrates an exemplary payment processing system 10 according to one embodiment of the invention that includes an anomaly detection system. An individual 24 desires to process a transaction using a payment card and utilizes any of channels 30-38 that communicate with an enterprise processor 20 in order to determine whether or not to process the transaction. The transaction may be to provide payment for any type of physical goods, for digital goods, or for a service such as recharging a mobile telephone or device, topping up a mobile telephone, incrementing a prepaid account, bill payment, money transfer, digital download, electronic tickets, online games, online gambling, and so on. The digital goods may include airline tickets, event tickets, gift cards, virtual gift cards, reloading money onto a gift card, digital music, credit for games, etc. The payment card (not shown) that the individual desires to use may be a credit card, a charge card, a debit card or another physical card, or even a virtual card such as PayPal, crypto currency, eCheck and so on. In general, the transaction is a card-not-present (CNP) transaction because although the individual 24 is in possession of the card (or at least knows the card number, expiration date, etc.), the merchant is unable to see the card because the individual is remote and is using an electronic channel in order to complete the transaction.

The channels include a Web channel in which the individual typically uses a computer 30 (desktop, laptop, tablet, etc.) in order to submit a transaction to the processor 20, although the individual may also use a mobile telephone with a Web browser to submit a transaction. More traditionally, the individual may use a corded or cordless telephone 32, or a mobile telephone 34, in order to submit a transaction via a live agent channel 42, or via an interactive voice response (IVR) channel 44. An application on a mobile telephone 36 may also be used to submit a transaction via an "app" channel, and mobile telephone 38 may be used to submit a transaction via an SMS channel in which text messages (or similar) are used. A "text-to-pay" channel may also be used with mobile telephone 38. Although not shown, another possible channel is an automatic recurring top-up of a prepaid account of a mobile telephone (for example); such an automatic transaction may not necessarily be initiated by the individual, but may be generated from within processor 20.

As is known in the art, telephone 32 may use the Public Switched Telephone Network (PSTN), and wireless devices 34-38 may use a wireless network such as any digital or analog cellular network, a PCS network, a satellite network, a radio frequency network, or other similar wireless network to communicate with an enterprise 20. Computer 30 may use an Internet Service Provider to connect over the Internet to enterprise 20.

As one of skill in the art will appreciate, individuals around the world are using these channels and others to submit transactions that are forwarded to processor 20 around-the-clock, resulting in a constant order flow that is handled by customer relationship management (CRM) software 50. CRM software 50 is executing upon any suitable server computer or computers within an enterprise 20. The same computer (or others) may also be used by enterprise 20 to host the IVR system 44, the risk decision engine 70, or for other functions needed to implement the payment processing system.

As will be appreciated, the incoming order flow from these channels includes a variety of data that is not only specific to a particular transaction but also may be specific to the channel being used by the individual, and, certain data is collected and stored for each transaction. For each transaction, the CRM software stores into transaction data 60 a record of each transaction, typically storing data elements such as: payment card number (which may be encrypted), expiration date, name and address of the individual, geographical location where the individual is located, amount of the transaction, e-mail address, shipping name and address, IP address of the computing device being used, telephone number of the channel being used, device information of the computing device being used, Internet service provider (ISP) being used, device fingerprint and related device characteristics, social media network linkages, etc.

Continuously, or periodically, the information records in transaction data 60 are used to generate any number of profile tables 64. A profile table lists attempts, risk variables, risk metrics and alerts based upon a particular data element found within transaction data 60. A profile table for the data element bank identification number or BIN (the first six digits of the payment card number which identifies a bank) may indicate the number of transactions attempted per issuer in a particular time period. Or, a profile table for ZIP code indicates the number of attempted transactions originating from particular ZIP codes in a given time period. A profile table also records, for each data element, risk variables such as the AVS No Match Attempts Amount that indicates the total amount of transactions having address mismatches based upon a particular time period. Another risk variable is New Payment Device Attempts Amount, the total amount of transactions having new payment devices (new payment card numbers) based upon a particular time period. Third risk variable is New SVA Attempts Amount, the total amount of transactions having new SVA based upon a particular time period. Fourth risk variable is Attempts Amount with location mismatch between Payment Device and SVA in a particular time period.

A profile table is a logical concept and although it may be represented and stored in a physical table separate from transaction data 60. From a fraud detection standpoint, a profile table is a status indicator of system-wide risk within payment processing system 10. As such, each profile table may be thought of as a risk indicator that is supplied to risk decision engine 70 to help make decisions on transactions. Because the order flow is constant, the profile tables are updated in real time as transactions are stored within transaction data 60. In one example, if a fraudster buys 100,000 payment cards that had been stolen from Citibank, and then begins to sell or use these cards, there will be a surge in transactions originating from Citibank, and in the Citibank BIN data element, and the BIN profile table will show anomalies. Or, should a fraudster attempt to submit numerous transactions (perhaps using different payment cards) from a single ZIP code, or attempt to ship goods to a single ZIP code, the profile table for ZIP codes will show anomalies in that particular ZIP code row. An anomaly may present itself in any of the risk variables described below. For example, the proportion of AVS No Match Attempts Amount over all Attempts Amount may show anomalies if fraudulent transactions result in a surge of mismatch of addresses between an address submitted during a transaction and the address the bank has on record, when normally there is a relatively stable proportion of transactions in a given time period for which the addresses do not match.

As will be explained in greater detail below, risk decision engine 70 includes algorithms to process an incoming transaction, and using profile tables 64, makes a decision as to whether to process a transaction 72, to deny a transaction 74, or to submit a transaction for further manual review 76. The outputs 72, 74 or 76 from risk decision engine 70 may take the form of computer instructions given to CRM software 50, may be output onto a display of a computer screen, may be printed, maybe output via a speaker, etc. The outputs may also be used as input into another algorithm for further analysis or may be fed back into the decision engine in order to directly alter the behavior of the on-line production system related to fraud.

Accordingly, the risk decision engine may direct the CRM software 50 to communicate with the acquirer bank 82, communicate with the issuer bank 84 and communicate with the merchant billing platform 86 (such as for a telecommunications carrier) about whether or not to recharge a particular telephone, whether to reload money onto a virtual gift card, whether or not to ship the physical or digital goods that the individual wishes to purchase, etc. For example, if the decision engine 70 decides to process 72 a transaction, then an authorization is requested from the issuer bank (typically via the acquirer bank), the merchant 86 is directed to deliver the goods or services to the individual, and eventually the issuer bank settles with the acquirer bank. If the decision engine decides to deny 74 a transaction, then no payment settlement is sent, and the merchant is informed that the transaction is denied (and no goods or services will be delivered).

Figure 2:
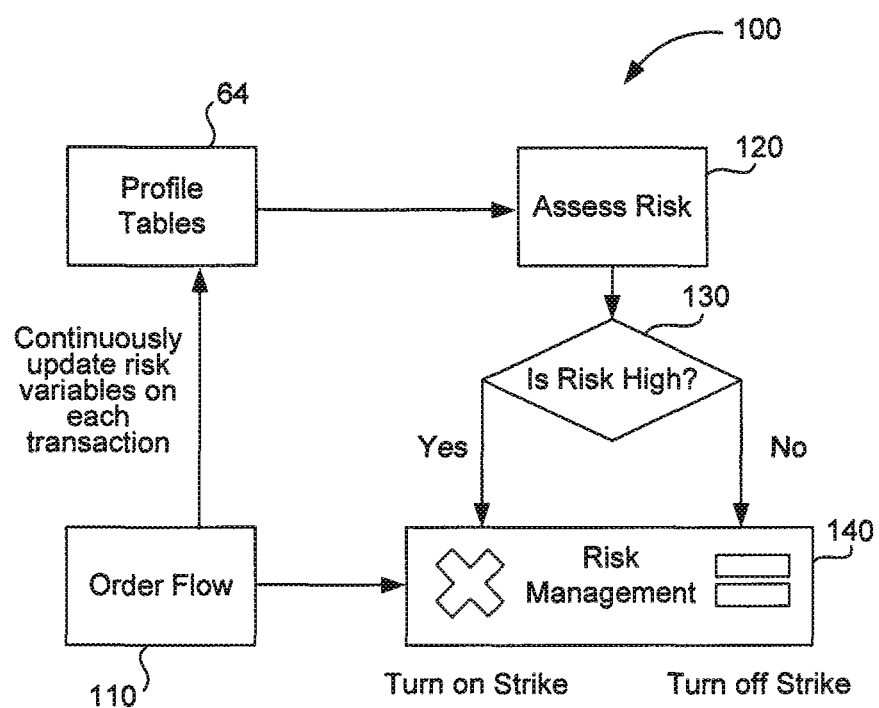
FIG. 2 is a conceptual overview of the fraud detection system.

FIG. 2 illustrates a conceptual view 100 of the operation of the payment processing system which will be described in greater detail below. As previously mentioned, order flow 110 is a continuous stream of proposed transactions originating from devices 30-38 and forwarded to enterprise 20 via any of the channels mentioned above. As the transaction data is received and stored into the database 60, certain data elements of the transaction data are used to continuously update the various risk variables and risk metrics found in the profile tables, which are described in greater detail below. In turn, the risk decision engine 70 uses information from the profile tables and information from the transaction data in order to assess risk 120, to determine whether the risk is too high or not 130, and finally to make a risk management decision 140 regarding the current transaction. Risk management 140 may turn on a strike meaning that the current transaction is denied or that its status is set to pending, and that the transaction will undergo a manual review. Or, the transaction is approved. Also, an alert for a particular data element of a profile table may be turned on, resulting in heightened scrutiny for future transactions including that particular data element.

In addition, one or more parameters for a fraud model may be adjusted. Advantageously, the assessment of risk assesses the system level risk and may result in not only the particular transaction being denied, but also in an alert being turned on and a fraud model being adjusted to more carefully screen future transactions. For example, if the percentage of new payment devices dramatically increases during a given hour, this can mean that a fraudster has suddenly begun using stolen credit cards. Parameters of a fraud model may then be adjusted to tighten the screening for new payment devices in an attempt to deter future fraud.

Profile Table Example

Figure 3B:

FIGS. 3A and 3B illustrate one example of a profile table. As previously mentioned, any number of profile tables may exist within payment processing system 10; in this example, a billing city profile table 200 is shown. The billing city profile table indicates, for each of many thousands of different cities, the value of particular risk variables that are updated continuously as each new transaction comes in. In other words, as each new transaction is entered into transaction data 60, this information is also used to update in real time any or all of the profile tables, depending upon the data received and the risk variables in each profile table. In this example, billing cities are profiled and each row identifies a particular city or that element of a transaction.

A first column 204 lists a particular billing city (i.e., that city associated with the payment card), and columns 208-228 list relevant risk variables whose values may be continuously updated as each transaction comes into the enterprise processor 20. In addition to the billing city, this profile table may also include columns that identify a billing city identifier, a billing region (such as a state), a billing country code, etc. Only a handful of cities and risk variables are shown, it should be appreciated that there may be many thousands of cities in such a profile table and that there may be many more risk variables and values as well.

Column 208 indicates the dollar amount of transactions with AVS (address verification service) mismatches that have occurred based upon the past hour for all attempted transactions in particular cities. In addition to column 208, other related columns (not shown) may represent the dollar amount of AVS mismatches within each city based upon other time periods such as within the past day, within the past three days, within the past seven days, and within the past 30 days.

Column 212 indicates the dollar amount of transactions with new payment devices (e.g., a credit card or debit card) that have been created based upon the past day for all attempted transactions in particular cities. In this example, "new payment device" means the first time that processor 20 has seen the payment device. In addition to column 212, other related columns (not shown) may represent the dollar amount of new payment devices created within a city based upon other time periods such as within the past hour, within the past three days, within the past seven days, and within the past 30 days.

Column 216 indicates the dollar amount of transactions with new stored value accounts (i.e., a new account holding value for a particular telephone) based upon the past three days for all attempted transactions in particular cities. In addition to column 216, other related columns (not shown) may represent the dollar amount of new stored value accounts created within a city based upon other time periods such as within the past hour, within the past day, within the past seven days, and within the past 30 days.

Column 220 indicates the dollar amount of transactions with mismatches between the city corresponding to the payment device and the city corresponding to the location of the telephone based upon the past seven days for all attempted transactions in particular cities. If a number of credit cards have been stolen, it is likely that the city corresponding to a particular credit card will not match with the location of a telephone that a fraudster is attempting to top up with the stolen credit card. In addition to column 220, other related columns (not shown) may represent the same city mismatch for a particular billing city based upon other time periods such as within the past hour, within the past day, within the past three days, and within the past 30 days.

Column 224 indicates transactions attempted based upon the past 30 days in particular cities; other related columns for other time periods may also be present as well in this table. Column 228 indicates the total dollar amount for transactions attempted based upon the past hour within particular cities; other related columns for other time periods may also be present as well in this table.

Of course, there are many other types of profile tables that organize the transaction data and group the various risk variables described based upon a particular data element of transactions. Thus, in addition to a billing city profile table that has a column similar to 204 listing billing cities, there is a BIN (bank identification number) profile table in which a column similar to 204 lists the various bank identification numbers. And, there is an IP address profile table with a column similar to 204 listing the various IP addresses from which transactions originate. Other examples include an ANI profile table (listing call origination numbers), an area code profile table (listing area codes of past transactions), a billing ZIP code profile table (listing zip codes), a computing device identifier profile table listing unique identifiers for computing devices), a screen resolution profile table (listing the screen resolution of the computing device that the individual is using to place a transaction), an ISP profile table (listing the ISP used to submit the transaction), an operating system profile table (listing the particular operating system executing on a computing device that is used to initiate a transaction), and a combined operating-system screen-resolution profile table.

As shown in the example table 200, each of these other tables includes a row per data element listing values for risk variables and risk metrics as will be described below. In fact, as more is learned about fraudulent transactions and fraudsters, other profile tables may be added to the collection of profile tables.

As the profile tables are updated continuously in real time as each transaction comes in to the processor 20, the risk decision engine 70 is assessing risk and making decisions based upon the risk variables, risk metrics and other information using certain calculations that will be described in detail below. For example, column 232 shows the risk metric "Risk Type 1 Attempts Amount One Day" and the corresponding "Risk Type 1 Alert" 236 (although not shown, other related columns include "Risk Type 1 Attempts Amount" for the past hour, three days, etc.). When one of these risk metrics of Type 1 exceeds a particular threshold, then a strike is activated. The current transaction is then either denied or remains pending subject to manual review. Also, an alert may be turned on. Conversely, when the value falls below a particular threshold, then the alert may be turned off.

Shown in columns 240 and 244 are dates and times for when an alert of risk Type 1 is turned on or off. Column 240 shows when the alert was turned on, while column 244 indicates that the alert has not yet been turned off. As mentioned, in addition to Type 1 risk metrics, there are also Type 2, Type 3 and other risk metrics. Shown in column 248 is a risk metric of Type 2 which has a value of 0.0068 for the city of Fremont. Column 252 shows that the corresponding alert for this risk Type 2 is currently off, while columns 254 and 256 show when an alert of this type is turned on or off. As shown, the alert was turned on on Aug. 3, 2014 and was turned off on Aug. 5, 2014.

As will be explained in greater detail below, values are calculated in real time for each payment transaction for the risk variables and the risk metrics of each profile table. For each risk variable, a percentage may be calculated out of the overall attempts in a given time period in order to compare the percentage to a particular threshold in order to assess risk. Although this technique may be a good indicator of risk for certain transactions, an improved technique assesses risks by comparing the risk metrics to certain threshold. Because a risk metric is based upon multiple risk variables, it is more effective at assessing risk and better at reducing false positives.

Fraud Model Optimization Flow Diagram

Figure 4:
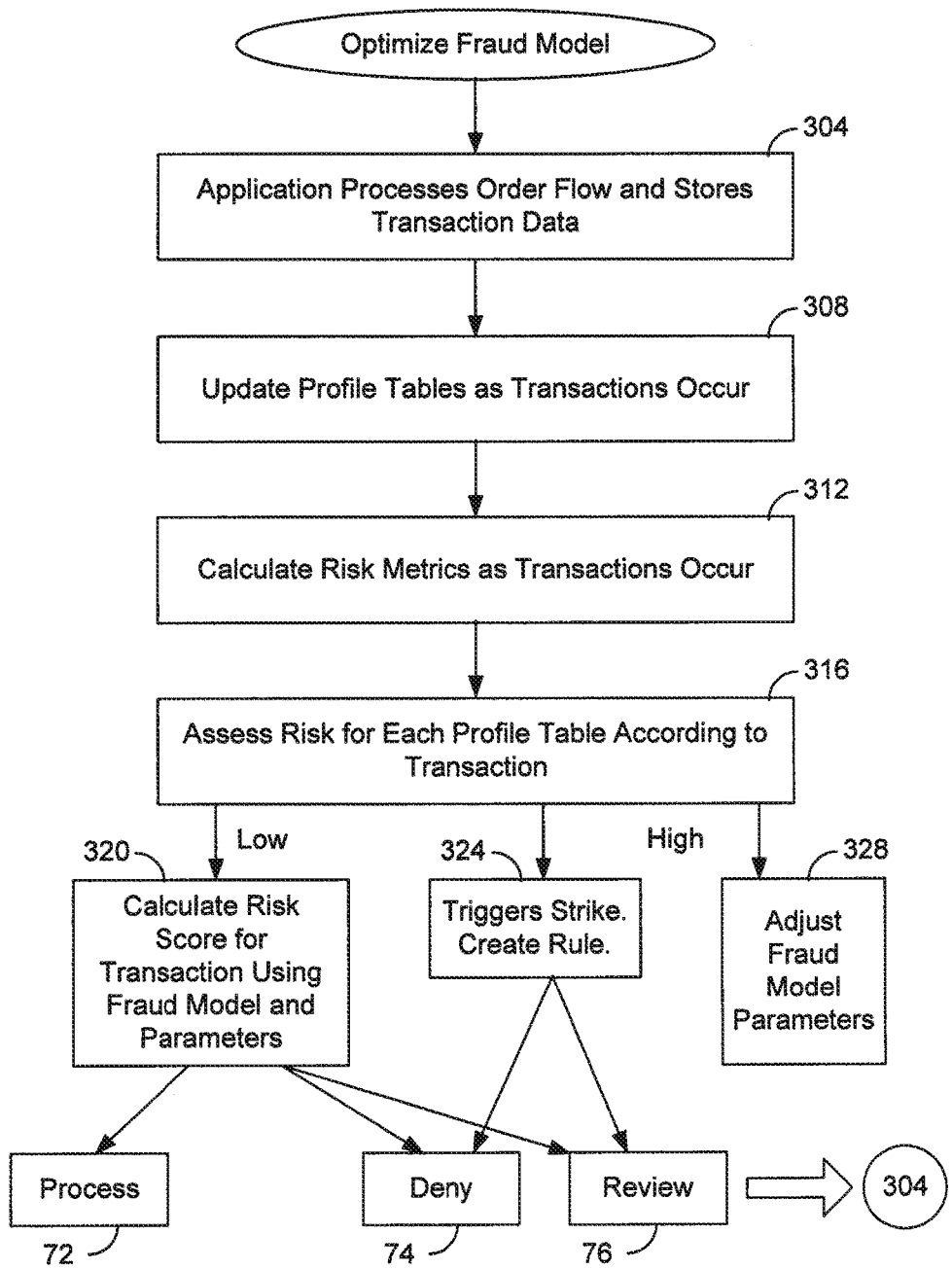
FIG. 4 is a flow diagram describing how a fraud model is optimized in real-time.

FIG. 4 is a flow diagram describing how a fraud model or models may be optimized automatically in real time. As explained above with respect to FIG. 1, in step 304 application software 50 executing upon a computer within an enterprise 20 continuously receives and processes order flow transactions that originate within the United States, and potentially from anywhere in the world. This order flow is a continuous stream of transactions occurring 24 hours a day, seven days a week. Each transaction is then stored within transaction data 60 as it is received.

In step 308, as each transaction occurs, all profile tables within the system are updated using information from the current transaction. A profile table may be updated by calculating values for the risk variables in an existing row of the profile table, or, the table may be updated by inserting a new row and then calculating values for that row. For example, looking at FIG. 3, if the billing city of the current transaction is "Fremont" then the values for the various risk variables in columns 208-228 will be updated as described below. On the other hand, if the billing city of the current transaction is "Vancouver," and this city does not yet exist in the billing table, then a new row is created in table 200 having "Vancouver" in column 204 and appropriate new values will be created and stored in columns 208-228. Of course, this process applies to all profile tables; e.g., if the area code of the current transaction has a row in the area code profile table then that row will simply be updated, if the current area code does not yet occur in the area code profile table then a new row for that area code will be inserted. For a device identifier profile table if the unique identifier for the computing device used to originate a transaction does not yet have a row in the device identifier profile table then a new row for that particular unique identifier will be created in the device identifier profile table and stored in the first column. On the other hand, if the unique identifier already has a row in that table, then the values in that row are simply updated.

Once a transaction comes in, the system parses the record of the transaction in order to identify fields in the record that correspond to the existing profile tables. For example, if the current profile tables in the system include a billing zip code profile table, a BIN profile table and an IP address profile table, then the system extracts the data elements billing zip code, BIN and IP address from the current transaction record. In other words, the engine 70 extracts the data element from the transaction data needed by each profile table. If the billing zip code, for example, does not yet exist in the billing zip code profile table then a new row is created for that billing zip code and initial values are determined for the risk variables. For a counting risk variable (like Attempts), the initial value is simply "1." For a risk variable that keeps track of an amount (like "Attempts Amount"), the initial value is simply the amount of the transaction.

On the other hand, if the BIN, for example, from the current transaction does already exist in a row of the BIN profile table, then the values for the risk variables in that row are then updated as is described below. Thus, for each transaction, each profile table will be changed, but likely only a single row in each profile table will have its risk variables updated. New profile tables for other fields of a transaction record may be added to the system from time to time.

An exponential decay calculation is used to update the value of a risk variable for transactions other than the initial value. The formula used is:

$$V(\text{new}) = V(\text{current}) + V(\text{existing}) \times e^{-(t-t(e))/t(d)}$$

where

V(current) is the amount in dollars of the current transaction,

V(existing) is the current value of the risk variable in the profile table, e is Euler's number, t is time of the current transaction, t(e) is the time when V(existing) was last updated, t(d) is a predefined time constant, e.g., one hour, one day, three days, etc., and V(new) will be the new, updated value for the profile table.

For example, assume that for the current transaction the billing city is Fremont, the amount of the current transaction is $100, that the current transaction has resulted in an AVS mismatch and thus it is desirable to update column 208. V(current) will be $100; V(existing) will be 0.079 as shown in table 200, t is the time of the current transaction, t(e) is the time when the value 0.079 was last updated, and t(d) will be one hour. Of course, all of the time quantities use the same units, such as seconds, minutes, etc. Although not shown, the quantity t(e) is stored in the profile table along with the value for the risk variable to which it corresponds. A new value for this risk variable will be calculated and then column 208 will be updated for the city Fremont. Because an AVS mismatch has occurred, values for the other risk variables for an AVS mismatch (e.g., one day, three days, etc.) will also be calculated and updated in the table.

It is possible that values for certain risk variables will not be calculated and inserted for a given transaction. For example, if the current transaction does not result in a payment device/telephone city mismatch, then the risk variable in column 220 (and corresponding risk variables for the other time periods) will not be updated because there has been no mismatch. Similarly, if the current transaction does not reflect a new payment device being created then the risk variable in column 212 (and corresponding risk variables for the other time periods) will not be updated. If, however, the current transaction does indicate that a situation has occurred described by a risk variable, then that risk variable will be calculated and updated. For example, if the current transaction indicates a new stored value account in the city of Fremont, then the value in column 216 (and corresponding risk variables for the other time periods) will be updated for the city of Fremont.

Use of an exponential decay calculation has numerous advantages. For one, the calculation of a new, updated value for a risk variable depends only upon the existing value and the value for the current transaction; it is not necessary to sum up any number of amounts for previous transactions over a longer time period. Prior art techniques sum up transaction amounts for transactions over the past 30 days in order to calculate a value for a 30-day risk variable; such a prior art technique is not efficient and affects performance of the risk decision engine. The exponential decay calculation inherently takes the past time period into account through the use of the variable t(d). In addition, a decay calculation can more accurately predict fraud. A prior art technique would consider that five $100 transactions that occur over the past 30 days involve the same risk as five $100 transactions that occur over the past day. The decay calculation, however, due to the decay factor, places more weight on the latter situation in which the five transactions occurred during the past day—which could indicate fraud. Such a calculation flags a situation in which an individual's credit card is stolen and is used rapidly five times in the course of a single day to recharge a telephone, when the individual would only normally recharge his telephone five times over the course of 30 days. Other, similar exponential decay calculations may also be used. Once relevant risk variables are updated for a row of a profile table corresponding to the current transaction, then control moves to step 312.

In step 312 risk metrics are calculated as each transaction occurs corresponding to the data within each transaction. A risk metric will be calculated only if certain criteria are met for a particular transaction. A risk metric indicates potential risk of a data element in a profile table, i.e., a row in a profile table. For example, the first row of profile table 200 includes a particular billing city "Fremont," a data element. The risk metric "Risk Type 1 Attempts Amount One Day" is a risk metric that indicates potential risk for the city of Fremont (and for other cities) based upon previous transactions amounts calculated as described below. Although not shown, other risk metrics of this same Type 1 may also be calculated for each row of this profile table (and for rows in the other profile tables) and include "Risk Type 1 Attempts Amount" for the past one hour, for the past three days, for the past seven days, and for the past 30 days. Altogether, there are five risk metrics of this Type 1 that may be calculated for a row in a profile table if the current transaction meets certain criteria.

When a given transaction comes in and meets the criteria for a particular risk metric, the five risk metrics (one hour, one day, three days, seven days and 30 days) of that type will be calculated and their values updated for a particular row in each of the profile tables, i.e., not every row in a profile table will have its risk metrics calculated. For example, if a transaction were to come in in which the billing city is "Fremont," and the transaction meets the criteria for one or more risk metric types, then the risk metrics in the "Fremont" row in the billing city profile table will be calculated and the values updated; the other rows representing the other cities would not be updated. The same holds true for the other profile tables. For example, assuming the transaction meets the criteria for the risk metric Type 2, if the area code for that particular transaction is "415," then the risk metric Type 2 for that particular row of the area code profile table will be calculated and updated for that particular transaction. Of course, when the next transaction comes in, it may be that a risk metric associated with the row of another city or another area code are calculated and updated. It is possible that for a given transaction that none of the criteria will be met for any of the risk metric types and that no risk metric values will be calculated for any table.

An attempt of Risk Type 1 is defined as a transaction having: an AVS mismatch, a new payment device, a new stored value account, and a payment device/SVA city mismatch. A variety of other risk types may also defined. For example, an attempted transaction of Risk Type 2 is defined as having: an AVS mismatch and a new payment device. In addition to the risk metric of Type 1 mentioned above, this second risk metric "Risk Type 2 Attempts Amount" may be calculated for a particular row of each profile table after each transaction assuming that its criteria are met, and, as with Type 1, there are five individual risk metrics associated with this Type 2: the past hour, the past day, the past three days, the past seven days, and the past 30 days. A Type 3 risk metric is defined as having: a new payment device and a payment device/SVA city mismatch. The different types of risk metrics are used to catch different types of fraud, or perhaps to catch fraudsters who may or may not have certain information about an individual. Thus, for each transaction the criteria for each type of risk metric are evaluated, and if the criteria for a particular risk metric are satisfied, then five risk metric values for that particular risk metric will be calculated for a particular row in each profile table.

A risk metric value is also calculated using the exponential decay formula described above used to calculate the values for risk variables. Assuming that a particular transaction for $50 meets the criteria for a risk of Type 1, and that the billing city is Fremont, consider column 232 of profile table 200. V(current) will be $50, V(existing) is the current value in that column, namely, 1.116E-08, t and t(e) are as described above, t(d) will be one day (or one hour, three days, etc. for the other risk metrics of Type 1), and V(new) will be the new, updated value that will be inserted in column 232 for the city of Fremont. A calculation will be made for all five risk metric values of Type 1 and inserted into this table in the Fremont row. And, risk metric values of Type 1 will be calculated for rows of other profile tables depending upon data elements of the current transaction. E.g., if the current transaction has a data element in which the area code is "510" then risk metric values of Type 1 will be calculated for that row of the area code profile table in which the data element is "510." The risk metrics for Type 2 and for Type 3 will be calculated in the current transaction meets the criteria for those types. Again, calculation of a risk metric value in this fashion using a decay formula has the advantages described above.

Figure 6A:
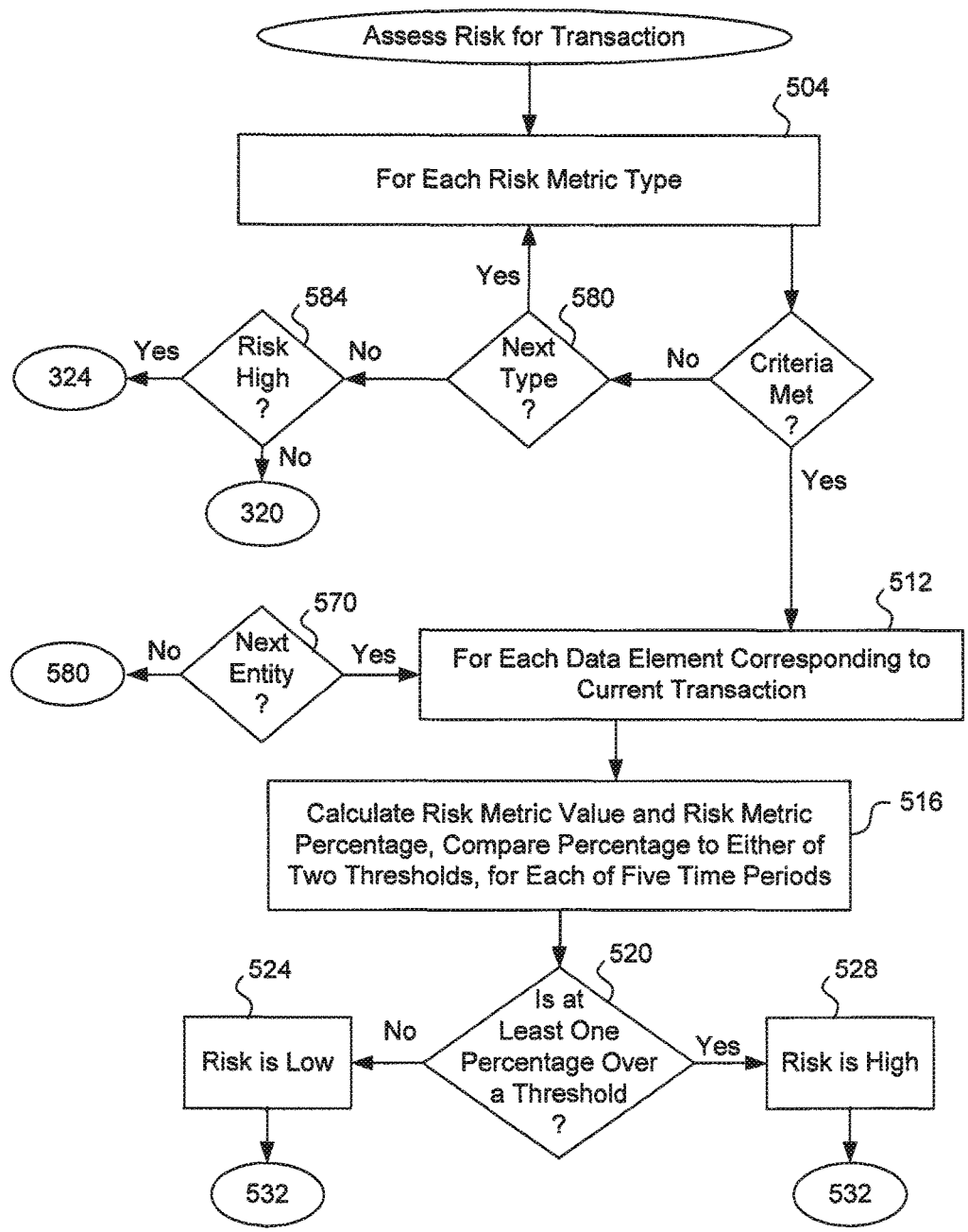
FIGS. 6A and 6B are a flow diagram describing step 316 of FIG. 4.
Figure 6B:
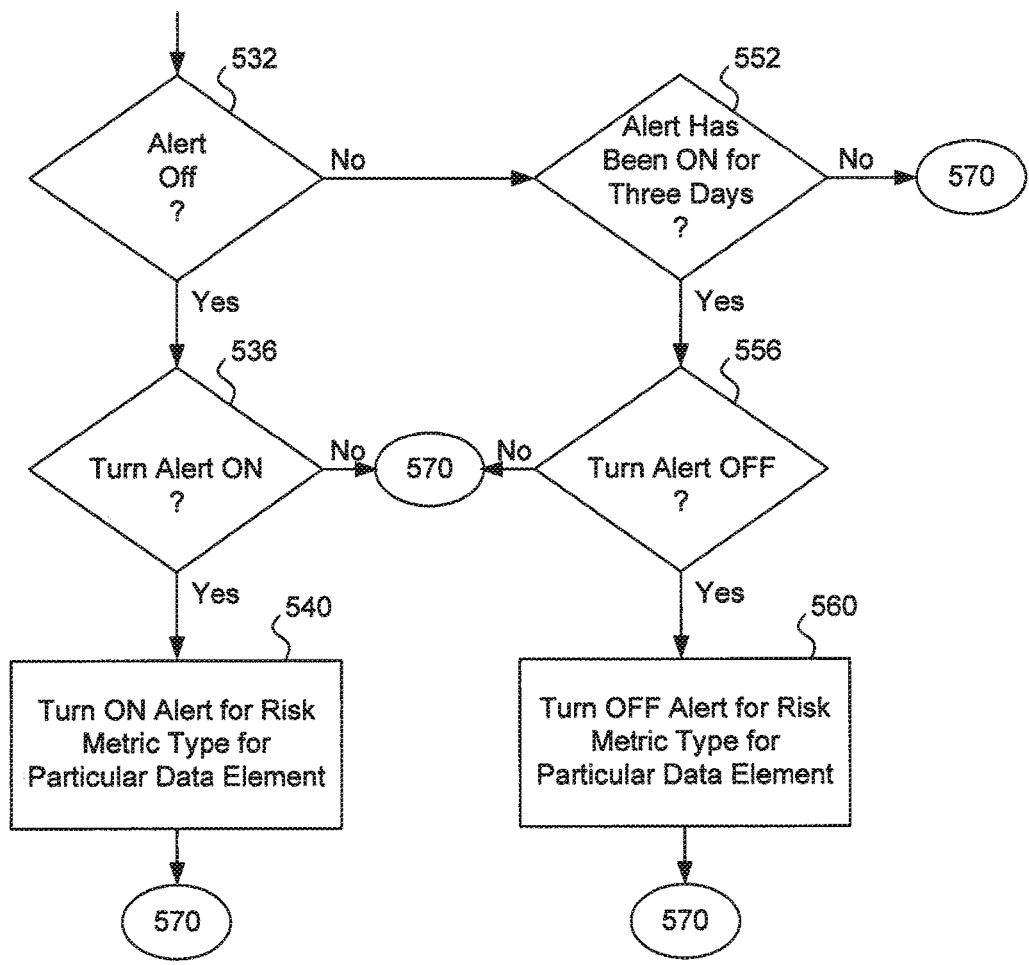

Step 316 assesses the risk for each profile table according to the current transaction. An example is provided immediately below and FIGS. 6A and 6B provide a flow diagram for this step. For example, if the billing city for the current transaction is "Skokie," then the risk variables for that city will have been updated in step 308, the risk metrics for that city will have been calculated in step 312, and then in step 316 the risk for that particular city is assessed by comparing its risk metrics to threshold values. Of course, the risk will also be assessed in the other profile tables according to the data element found in the current transaction, e.g., if the current transaction originates from a computing device using the Android operating system, then the risk for the Android operating system will be assessed in the operating system profile table by comparing the risk metrics in the Android operating system row to threshold values. Advantageously, risk is assessed as each order comes in, i.e., there is no lag time.

In order to assess risk in step 316 the recently calculated risk metrics are compared to predefined threshold values (which may be different per metric and different per time period) that are based upon particular fraud models and analysis. A transaction example will be used in which the billing city is Fremont (shown in profile table 200), in which the criteria for risk metric 232 have been met and new values for this risk metric have been updated in the table. Because there is a new value, risk will now be assessed for this particular risk metric, namely, Risk Type 1 Attempts Amount One Day.

Different Thresholds Example

Figure 5:
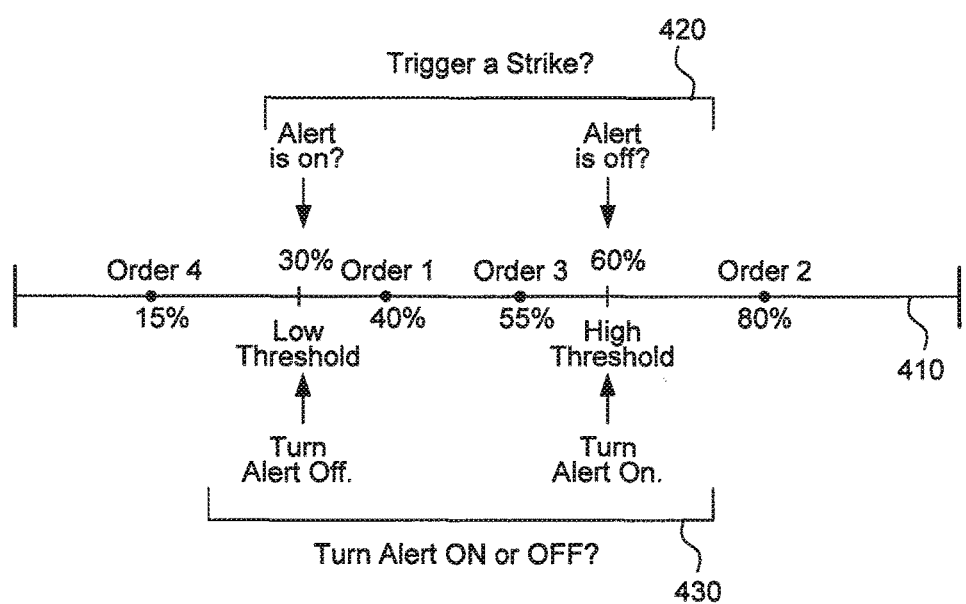
FIG. 5 is an example showing how to determine whether to trigger a strike and whether to turn an alert on or off based upon a percentage value of a particular risk metric.

FIG. 5 illustrates a graph 410 showing possible percentage values for the quantity (Risk Type 1 Attempts Amount One Day)/(Total Attempts Amount One Day)*100. In other words, the percentage of Risk Type 1 Attempts Amount out of all Attempts Amount is calculated for each time period (e.g., one hour, one day, three days, seven days or 30 days), assuming that the criteria for this particular risk metric is met for this transaction. In this example, graph 410 only shows possible percentages and threshold values for the risk metric Risk Type 1 Attempts Amounts One Day. There are two thresholds associated with each risk metric for a particular time period, a low threshold (in this example 30%) and a high threshold (in this example, 60%). In order to assess risk in step 316 a first determination 420 is made as to whether the risk is High and that a strike should be triggered. If the alert for this risk type is currently OFF then the threshold for comparison is 60%, whereas if the alert for this risk type is currently ON then the threshold for comparison is 30%. A second determination 430 is made as to whether the alert should turned ON if it is currently OFF, or whether the alert should returned OFF if it is currently ON.

In this example, assume that the alert for this risk metric (for all time periods) is currently OFF and that a first transaction arrives, order 1, and that the percentage calculated is 40%. Because the alert is OFF, 40% is compared to the high threshold of 60% and because it is not over that value then no strike is triggered based upon that particular calculation for that particular risk metric for that particular time period. In addition, the alert will not be turned ON because 40% is not greater than 60%. When order 2 arrives its percentage is 80% which is over the high threshold of 60% (the alert is still OFF) and a strike will be triggered. In addition, because 80% is greater than the high threshold of 60% the alert for this particular risk metric will be turned ON. Once an alert is turned on for a particular risk metric the threshold for determining whether to trigger a strike or not changes and becomes more restrictive, i.e., the threshold becomes lower and it becomes easier to trigger a strike. For example, now column 236 shows that for the city of Fremont an alert has been turned on for a risk metric of Type 1. Of course, an alert may be turned on or off in any row of any profile table and there are alerts for different types of risk metrics.

Now, when order 3 arrives its percentage is 55%, but, because the alert is ON, 55% is compared to the low threshold of 30% and because it is over that value a strike will be triggered for this third transaction. Thus, the system adapts in real time to risk behavior in the city of Fremont and becomes more restrictive as to future transactions from that city. In addition, the second determination is made as to whether or not to turn off the alert during this third transaction. Because the alert is currently ON, the value of 55% is compared to the low threshold of 30% and the alert is not turned OFF because the value is not lower. When order 4 arrives its percentage is 15% which is lower than the low threshold of 30% so a strike will not be triggered. In addition, the alert will now be turned off because 50% is lower than the low threshold of 30%.

In general, when an alert is OFF the calculated percentage is compared to the high threshold to determine whether or not to trigger a strike and is also compared to the high threshold to determine whether or not to turn the alert ON. And, when the alert is ON, the calculated percentage is compared to the low threshold to determine whether or not to trigger a strike and is also compared to the low threshold to determine whether or not to turn the alert OFF. Of course, it is also possible to have different sets of thresholds for the two determinations. In other words, a low and a high threshold may be used to determine whether or not to trigger a strike 420 and different low and high thresholds may be used to determine whether to turn an alert ON or OFF 430.

The example of FIG. 5 only illustrates the flow for a particular time period of a particular risk metric in a particular city. As mentioned earlier, each risk metric (Type 1, Type 2, etc.) has five particular time periods for which a percentage is calculated and compared to thresholds as shown in FIG. 5. And, this calculation of percentages in comparison to thresholds may be performed for any particular row in any of the profile tables for the current transaction assuming that the criteria for a particular risk metric are met and an update for that risk metric has been performed. If the criteria for a particular risk metric are not met then the risk metric value is not updated and there is no need for the calculation of the percentage and comparison as shown in FIG. 5.

If at least one of the calculated percentages for the risk metrics (for any profile table) result in a percentage that is greater than the corresponding threshold, then the risk is deemed as "High" and control moves to steps 324 and 328. If none of the calculations for the risk metrics result in a percentage that is greater than the corresponding threshold, then control moves to step 320 and processing continues as described below. As mentioned above, it is possible that an alert for a particular risk metric type in a particular row of a profile table may be turned ON or OFF. An alert may be turned on or off regardless of whether a strike has been triggered.

Assess Risk and Turning Alerts on or Off Flow Diagram

FIGS. 6A and 6B are a flow diagram describing in detail step 316 of FIG. 4. Step 504 begins a loop which iterates over each risk metric type (i.e., Risk Type 1, Risk Type 2, etc.). If the criteria are met in step 508 for a particular risk metric type for the current transaction then step 512 begins a loop which iterates over each data element corresponding to the current transaction to determine whether to trigger a strike or turn an alert on or off. For example, for a given transaction, the data elements would be the specific row of each profile table corresponding to the particular transaction such as the billing city, the area code, the billing zip code, the operating system of the device, etc. In other words, all relevant profile tables are updated for the current transaction.

Next, in step 516 the risk metric value is calculated for each of the five time periods (e.g., one hour, one day, etc.), the risk metric percentage of attempts overall is calculated, and this percentage is compared to either of the two thresholds as explained above with reference to FIG. 5, for each of the five time periods.

In step 520, if any one of these five percentages is over the designated threshold then in step 528 the risk is designated as "High" and eventually control will be transferred to step 324 in order to trigger a strike. On the other hand, if none of the percentages are over the designated threshold, then the risk is temporally designated as "Low" and it is possible that control will eventually be transferred to step 320. Although, it is possible that calculation of the risk metric value for a different data element in another profile table would lead to the risk being designated as "High." Or, calculation of a risk metric value for the next risk metric type may lead to the risk being designated as "High." Once the risk is designated as "High" it remains so through the iteration of these loops and control will be transferred to step 324. By contrast, even though risk is designated as "Low" for a particular iteration, it is possible that the risk may later be designated as "High." It is also possible that as soon as the risk is designated as "High" control his immediately transferred to step 324 and a strike is triggered. Preferably, though, iteration continues through all data elements and all risk metric types as it may be necessary to turn alerts on or off as will be described below.

Once it is determined whether the risk is high or low for a particular data element, it is next determined whether an alert for the current risk metric type should be turned on or off for the current data element as is shown in FIG. 6B. In step 532 it is determined whether the alert for the current risk metric type for a particular row of a profile table is off. If yes, then in step 536 it is determined whether or not to turn that alert ON as has been described above with reference to FIG. 5. If so, then in step 540 the alert is turned ON for that particular risk metric type for that particular row of a profile table such as shown at 260 in FIG. 3.

Returning to step 532, if the alert is currently ON then in step 552 it is determined whether the alert has been ON for at least three days. In one particular embodiment of the invention, once an alert is turned on it may not be turned off (even though the risk metric percentage drops below a particular threshold) until an amount of time has passed. The reason is that once fraud is detected and an alert is turned on, it is effective to keep that alert on for a certain period of time because the fraudster is still active. A time period of three days is currently used, although other lengths of time may also be used. Each row of each profile table also keeps track of when the alert for each risk metric type is turned on or off. For example, profile table 200 also includes a column for "Risk Type 1 Alert ON Date and Time" and a column for "Risk Type 1 Alert OFF Date and Time." Each of these columns includes, for each billing city, the date and time when the alert was turned on or off, respectively. And, of course, there are corresponding columns for the other risk metrics of Type 2 and Type 3, etc. If the alert has been on for at least three days, then it is eligible to be turned off, and in step 556 it is determined whether or not to turn that alert OFF as has been described above with reference to FIG. 5.

If so, then in step 560 the alert is turned off for that particular risk metric type for that particular row of a profile table such as shown at 264 in FIG. 3.

If an alert will not be turned on or off, or once an alert is turned on or off, then control returns to step 570 to proceed to the next data element corresponding to the current transaction (e.g., once the risk metric values for the row in the billing city profile table have been processed for the particular billing city of the current transaction, then risk metric values may be calculated for the row in the area code profile table for the particular area code of the current transaction). Once this loop terminates in step 570, then control returns to step 580 to determine whether there is another risk metric type to process (e.g., is the criteria met for a risk metric of Type 2, etc.). Once all risk metric types have been processed then it is determined in step 584 if the risk has been designated as "High" at any point. If so, then control moves to step 324, and if not, control moves to step 320.

In an alternative embodiment, each profile table generates a strike if one of its risk metrics indicates that the risk is High. A transaction will not necessarily be denied if there is one strike, rather, the fraud model will take the number of strikes into account in determining whether or not to deny a transaction in step 320.

Trigger a Strike, Adjust Parameters and Calculate Final Risk Score

Step 324 triggers a strike against the current transaction in that the transaction will either be denied or will be submitted for manual review (pending). After a manual review, the transaction will either be processed or denied. Alternatively, control may also pass to step 320 where final decision is made by the risk decision engine using the fraud model, a rules module, and any strikes accumulated.

In addition to triggering a strike from a profile table, the system may create a new rule or adjust an existing rule in order to look at particular transactions more restrictively in the future. For example, if the billing city of the transaction was "Fremont," then a rule may be created to deal more restrictively with any future transactions from Fremont. By way of example, the rule may state "transactions from Fremont will not be allowed to top up a telephone account with an amount greater than $1000." Or, a rule may state "only allow 100 transactions per day from a particular city." Of course, other rules may be created or adjusted depending upon a different alert for another data element of the transaction. By way of example, if an alert was generated in the BIN profile table for a particular BIN (perhaps because a fraudster has stolen a large quantity of credit cards having that particular BIN), then the rule may state "transactions with that particular BIN must always be subject to manual review." Or, a rule may state "transactions from Android devices are limited to $100" (assuming that a risk metric for the data element Android in the operating system profile table was over its threshold).

Any alerts from any profile table may also result in a rule being created or adjusted to apply to future transactions. Advantageously, this creation or adjusting of rules happens in real time as the risk for each transaction is assessed. Typically, rules are handled by a particular module within the risk decision engine and applied during step 320. In general, decisions made by the risk decision engine use the rules module, the profile tables and a fraud model or models.

Or, in addition to rules being created or adjusted, a threshold value of a risk metric for a particular data element in any of the profile tables may be adjusted; for example, the threshold value for a risk metric associated with the city of Fremont may be lowered if that city has triggered an alert.

If the transaction is denied then flow continues to step 304, whereas if the transaction is sent for review, flow will still continue to step 320 for calculation of a final risk score using the fraud model (or using any of a variety of fraud models and rules).

In addition to step 324, step 328 will also be performed (in parallel or sequentially) and parameters of a fraud model or models may be adjusted. As is known in the art, a model is trained using historical data to determine which transactions are risky. Typically, a model generates a final numerical value and compares this to a threshold value (a deny parameter); values greater than the threshold result in the transaction being denied. In this step, this deny parameter may be adjusted to a lower value, but only for a particular risky city. For example, if a risk metric generated an alert for a transaction from New York in the billing city profile table, then in step 328 the deny parameter may be adjusted from 0.5 to 0.3, but only for transactions from New York. Transactions from all other cities will continue to use the deny parameter of 0.5. And, the deny parameter may be adjusted for other specific data elements, such as only for particular devices, only for particular BINs, only for particular operating systems, etc.

Other fraud model parameters such as the pending threshold and the deny threshold of a regression model may also be adjusted in this step. Advantageously, a model parameter is adjusted in real time as transactions are being processed and there may be numerous deny parameters being used (each with different threshold values) for different data elements (such as billing city, area code, billing zip code, IP address, etc.). Prior art models would only use a single deny parameter for all transactions and this parameter would not be updated in real time as transactions occur.

Computer System Embodiment

Figure 7A:
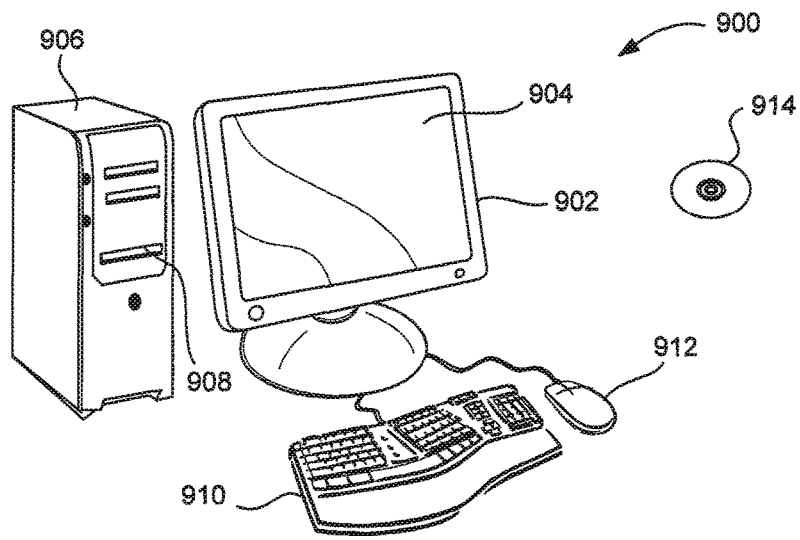
FIGS. 7A and 7B illustrate a computer system suitable for implementing embodiments of the present invention.
Figure 7B:
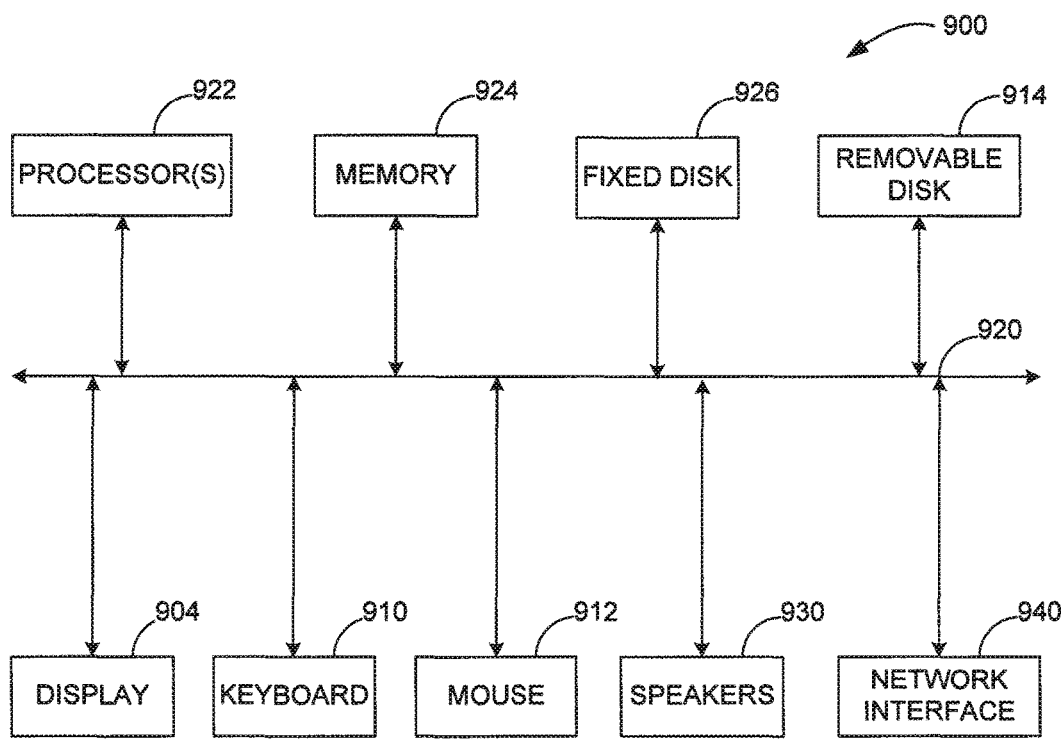

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of processing payment transactions, said method comprising:
   receiving, in a payment processing system, a continuous flow of payment transactions from a plurality of computing devices, each payment transaction being associated with a payment card;
   receiving a first payment transaction having a plurality of data elements from a first one of said computing devices, each data element being specific to said first payment transaction;
   calculating a first value for a risk metric, wherein said first value for said risk metric is specific to a first one of said data elements of said first payment transaction, and wherein said first value of said risk metric depends upon an amount of said first payment transaction and amounts of only those of said payment transactions that include said first data element occurring prior to said first payment transaction;
   comparing said first value of said risk metric corresponding to said first one of said data elements to a threshold that is specific to said first data element;
   determining that said first value of said risk metric exceeds said threshold;
   lowering said threshold;
   denying said first payment transaction based upon said determining;
   receiving, after said first payment transaction, a second payment transaction that includes said first data element from a second one of said computing devices and calculating a second value for said risk metric, wherein said second value is specific to said first data element, wherein calculating said first value for said risk metric uses a first exponential decay of an existing value of said risk metric over time and wherein calculating said second value for said risk metric uses a second exponential decay of said first value of said risk metric over time;
   comparing said second value for said risk metric to said lowered threshold; and
   denying said second payment transaction when said second value of said risk metric is above said lowered threshold.

2. A method as recited in claim 1, further comprising:
   not delivering goods or services associated with said second transaction from a merchant to a cardholder of said payment card associated with said second transaction.

3. A method as recited in claim 1 wherein said first value is stored in a profile table in association with said first data element, said method further comprising:
   replacing said first value with said second value in said profile table.

4. A method as recited in claim 3 wherein said first data element is one of a payment card number, an expiration date, a name of an individual, an address, a geographical location where said individual is located, an amount of said payment transaction, an e-mail address, a shipping name and address, an IP address of said first computing device, a telephone number, device information of said first computing device, an Internet service provider (ISP), a device fingerprint of said first computing device, or a social media network link.

5. A method as recited in claim 1 wherein said first data element is one of a payment card number, an expiration date, a name of an individual, an address, a geographical location where said individual is located, an amount of said payment transaction, an e-mail address, a shipping name and address, an IP address of said first computing device, a telephone number, device information of said first computing device, an Internet service provider (ISP), a device fingerprint of said first computing device, or a social media network link.

6. A method as recited in claim 1 wherein said calculating said first value does not include any summation of amounts from those of said payment transactions that occur prior to said first payment transaction and wherein said calculating said second value does not include any summation of amounts from those of said payment transactions that occur prior to said second payment transaction.

7. A method of processing payment transactions, said method comprising:
   receiving, in a payment processing system, a continuous flow of payment transactions from a plurality of computing devices, each payment transaction being associated with a payment card;
receiving a first payment transaction having a plurality of data elements from a first one of said computing devices, each data element being specific to said first payment transaction;
calculating a first value for a risk metric, wherein said first value for said risk metric is specific to a first one of said data elements of said first payment transaction, and wherein said first value of said risk metric depends upon an amount of said first payment transaction and amounts of only those of said payment transactions that include said first data element occurring prior to said first payment transaction;
comparing said first value of said risk metric corresponding to said first one of said data elements to a threshold that is specific to said first data element;
determining that said first value of said risk metric is lower than said threshold;
raising said threshold;
processing said first payment transaction based upon said determining; and
receiving, after said first payment transaction, a second payment transaction that includes said first data element from a second one of said computing devices and calculating a second value for said risk metric, wherein said second value is specific to said first data element, wherein calculating said first value for said risk metric uses a first exponential decay of an existing value of said risk metric over time and wherein calculating said second value for said risk metric uses a second exponential decay of said first value of said risk metric over time;
comparing said second value for said risk metric to said raised threshold; and
processing said second payment when said second value of said risk metric is lower than said raised threshold.

8. A method as recited in claim 7, further comprising:
delivering goods or services associated with said second transaction from a merchant to a cardholder of said payment card associated with said second transaction.

9. A method as recited in claim 7 wherein said first value is stored in a profile table in association with said first data element, said method further comprising:
replacing said first value with said second value in said profile table.

10. A method as recited in claim 9 wherein said first data element is one of a payment card number, an expiration date, a name of an individual, an address, a geographical location where said individual is located, an amount of said payment transaction, an e-mail address, a shipping name and address, an IP address of said first computing device, a telephone number, device information of said first computing device, an Internet service provider (ISP), a device fingerprint of said first computing device, or a social media network link.

11. A method as recited in claim 7 wherein said first data element is one of a payment card number, an expiration date, a name of an individual, an address, a geographical location where said individual is located, an amount of said payment transaction, an e-mail address, a shipping name and address, an IP address of said first computing device, a telephone number, device information of said first computing device, an Internet service provider (ISP), a device fingerprint of said first computing device, or a social media network link.

12. A method as recited in claim 7 wherein said calculating said first value does not include any summation of amounts from those of said payment transactions that occur prior to said first payment transaction and wherein said calculating said second value does not include any summation of amounts from those of said payment transactions that occur prior to said second payment transaction.

* * * * *